United States Patent [19]
Gerharz

[11] 3,961,851
[45] June 8, 1976

[54] PASSIVE STEREOVISION RANGE FINDER

[75] Inventor: Reinhold Gerharz, Bethesda, Md.

[73] Assignee: The United States of America as represented by the Secretary of the Army, Washington, D.C.

[22] Filed: Oct. 3, 1974

[21] Appl. No.: 511,876

[52] U.S. Cl. .................. 356/1; 178/6.5; 178/DIG. 36; 356/4; 356/12
[51] Int. Cl.² .......................................... G01C 3/00
[58] Field of Search ............... 178/6.5, DIG. 1, 20, 178/21, 36; 356/12, 15, 1, 4, 5, 163

[56] References Cited
UNITED STATES PATENTS

| | | | |
|---|---|---|---|
| 2,578,970 | 12/1951 | Gannaway | 178/6.5 |
| 2,955,156 | 10/1960 | Heilig | 178/6.5 |
| 3,706,493 | 12/1972 | Redmann | 356/4 |

Primary Examiner—Maynard R. Wilbur
Assistant Examiner—S. C. Buczinski
Attorney, Agent, or Firm—Nathan Edelberg; Milton W. Lee; Robert P. Gibson

[57] ABSTRACT

A passive mobile rangefinder and stereo viewer having at least two image converting television cameras each mounted on spaced apart, remotely controlled mobile supports with synchronous drives for azimuth and elevation control. Ranging components associated with each television camera, with data links to remote locations, provide continuous baseline variation data. A baseline selector and mixer data analyzer direct the video signals from the selected pair of cameras to the remote viewing location. A rangemarker in the observer's field of view or electronic correlation techniques provide the range data.

1 Claim, 1 Drawing Figure

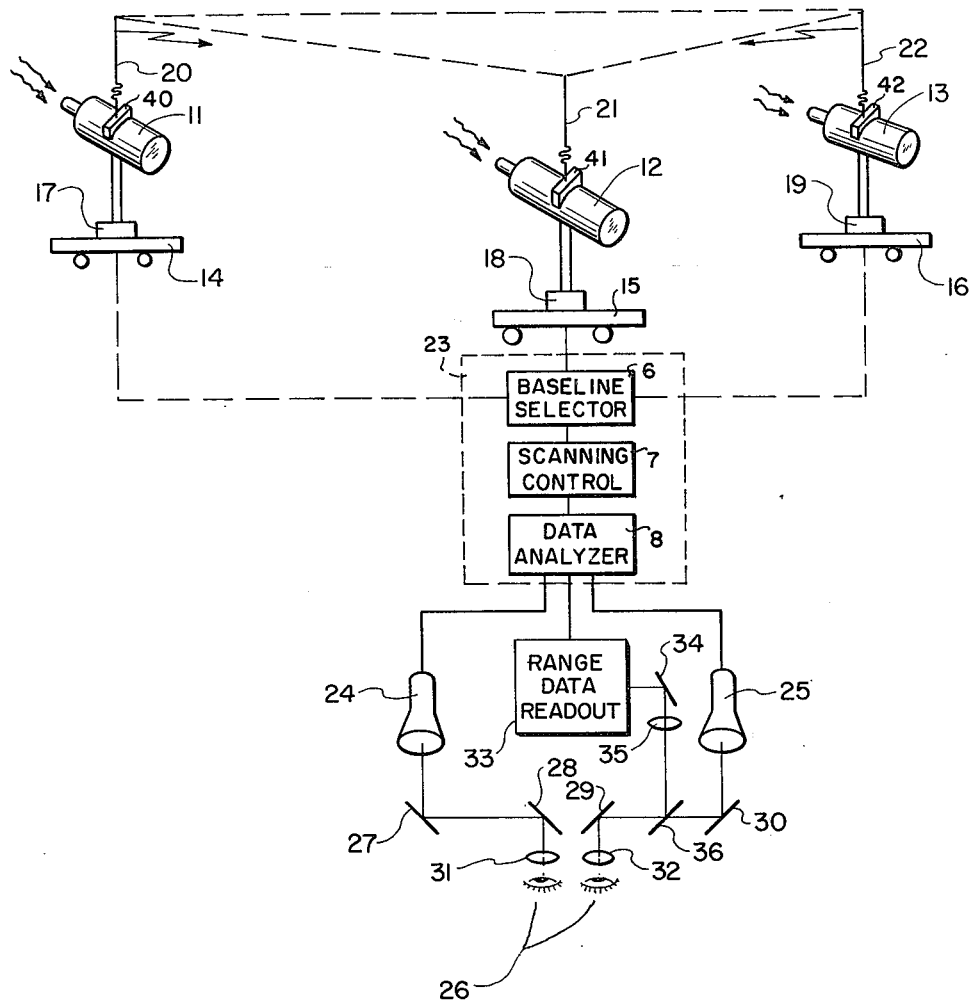

PASSIVE STEREOVISION RANGE FINDER

The invention described herein may be manufactured, used, and licensed by or for the Government for governmental purposes without the payment to us of any royalty thereon.

BACKGROUND OF THE INVENTION

The device disclosed belongs to a class of stereoscopic range-finders. In particular, to the class wherein optical viewing components are spaced apart on a baseline of known dimension thereby providing range determination and stereoscopic imaging.

Prior art devices required that the two separate image channels be controlled by complex mechanical and optical components manufactured to precise mechanical and optical tolerances. An optical baseline of about 30 meters has been cited as an upper limit for practicable ranging devices utilizing the visible spectrum. Further, these prior art devices have employed baselines that were fixed and held to a high degree of precision during the tracking and ranging of mobile targets.

The device herein disclosed utilizes a variable, mobile baseline arrangement with image converting cameras that operate over an extended range of the spectrum.

SUMMARY

Present technology is herein utilized to produce a stereovision ranging device employing one or more variable baselines. By positioning three image converting cameras, such as infrared cameras at the three vertices of triangle, and providing means for selecting any two cameras to function simultaneously, the two cameras that provide the maximum baseline spacing with respect to any particular object of interest may be chosen. If the object being ranged upon changes position to a location at which a different pair of cameras would view it with a greater baseline separation, these two cameras can be selected to continue the ranging.

Since the baselines are variable, means 40, 41 and 42 in conjunction with baseline selector 6 must be provided to instantaneously determine the spacing among the several cameras. This may take numerous forms, including a radar system such as that disclosed in U.S. Pat. No. 2,687,520. The system can be incorporated in a highly mobile unit and utilize telemetering subsystems. The mobile units could be any form of vehicle capable of carrying the camera system.

The input optical components depend upon the desired precision, magnification and wavelength range covered in the available spectrum region. For example, if thermal radiation capability is desired, only the input optics and the detectors need be changed to accommodate this area of the spectrum. The slant range of a target is either determined using a floating range marker or may be obtained by automatic analysis and electronic correlation of the two or more superposed images.

The most precise rangefinders in the visible range utilize baselines of about 30 meters and stereo optics and yield range readings to 40 kilometers with a range error, $\Delta r$ of about $\mp 110$ meters. The range error $\Delta r$ is derived from the formula:

$$r = \pm f \cdot r^2 / b \cdot m \cdot k$$

where:
- $r$ = range in meters
- $m$ = magnification
- $b$ = baseline (meters)
- $k$ = 1/206000
- $f$ = angular fault of instrument (arc seconds)

For application in the infrared region, using modest optical magnification, the angular fault can be reduced substantially by increasing the baseline. Thermal infrared systems will therefore not require a large magnification factor for deriving precise range data, but stereo-optic viewing is necessary to circumvent the lack of contrast in the image of most objects being observed in long wavelength spectrum regions.

Certain components of the system of this invention are either used in other types of similar rangefinding devices or are generally well-known in the art, and will not be described in detail in this disclosure. For example, image converting methods are described in the "Handbook of Military Infrared Technology" Library of Congress, Card 65–62266; the floating range marker utilized can be found in such works as "The Principles of Rangefinding" (Barr and Stroud, Ltd.) The University Press, Glasgow, Scotland (undated); or "Fernoptische Beobachtungs and Messinstrumente" by N. Gunther, Stuttgart, 1959, (Chapters 8, 9 and 10). Electronic correlation, noted above, is described in such works as, "The Electronic Correlator", by A. W. Stall in "Electronic Industries" p. 79, August 1965, "Korrelations-Elektronik" by F. H. Lange, Berlin 1962, and in U.S. Pat. No. 2,166,991, issued to G. Guaianella and entitled "Direction Finding Systems".

BRIEF DESCRIPTION OF THE DRAWING

The FIGURE shows the camera system employing three stereoscopic television viewing systems.

DESCRIPTION OF THE PREFERRED EMBODIMENT

Infrared television cameras 11, 12 and 13 are shown mounted on mobile bases 14, 15 and 16. Remote control devices in the form of synchronous drives shown diagrammatically as 17, 18 and 19 are associated with each of the input cameras for simultaneously controlling their movements to maintain the optical axes in mutual relationship as they scan an area of interest.

Since mobile bases are employed, and since it is necessary to know the distance between the particular cameras that are functioning in the passive ranging mode at any instant of time, each mobile unit carries an electromagnetic whip antennae 20, 21, and 22; the center of which intersects the optical axis of its camera unit in order to provide a geometric reference for determining and relaying the baseline information to a remote control location. Such a short range length determining system may take the form of the device disclosed for example in U.S. Pat. No. 2,687,520 to Fox et al; the particular system, however, is not critical to this disclosure.

The optical information outputs from the cameras are transmitted to a remote control unit 23 which includes the baseline selector 6, camera scanning control 7, floating rangemarker and data analyzer 8. The data links between the individual cameras and the remote unit 23 may comprise wires or utilize electromagnetic couplings; the latter being preferred because of the mobility of the system. The selector function assures that as the cameras are aimed at a particular target location, the two providing the greatest baseline separation are selected for target ranging. For example cameras 11 and 13, having the greatest separation for the area being viewed, are shown in the FIGURE to be functioning together. In one mode of operation, TV-stereo viewers 24 and 25 presenting the views seen by the two selected cameras are monitored by an observer 26; the observer having a stereoscopic presentation by way of reflectors 27, 28, 29, 30 and eyepieces 31 and 32. A range data readout 33 receiving its information from the electronic correlator housed in unit 23, provides a numerical display of the range to the target or object of interest in the field of view of those cameras then functioning together. This display would be presented to the observer 26 using reflectors 34 and 29, optics 35 and interposed beamsplitter 36. The electronic correlator performing the range analysis function automatically, making use of the separation of two consecutive points in the presented and superposed image frames from the cooperating cameras.

Alternatively, the floating range marker, mentioned above, could, by its well-known optical techniques, provide the range in the field of view of the observer 26.

In summary, the disclosed invention provides a passive ranging and stereovision system employing a highly mobile image converting television camera system utilizing large baselines for optimum ranging accuracy.

While only one embodiment of the invention has been disclosed, it is to be understood that many variations, substitutions and alternations may be made while remaining within the spirit and scope of the invention which is limited only by the following claims.

I claim:

1. A passive stereovision rangefinder system comprising:

image converting scanning means including at least three image converting television cameras positioned at various locations constituting the vertices of a triangle whereby the baseline for scanning and ranging in any particular area is maximized by remotely selecting the two cameras having the greater baseline separation;

at least three mobile base means with one of said cameras mounted on each base;

synchronous drive means associated with each of said cameras for remotely controlling their aiming while maintaining their optical axes in parallel relationship;

ranging means associated with each mobile base for determining the distance between said cameras;

a control site for controlling said synchronous drive means positioned remotely from said cameras, wherein said control site further includes selector means for selecting the two cameras having the greatest baseline when the cameras are pointed toward an area of interest, means for receiving and displaying outputs from said cameras and means for providing a range measurement from said outputs.

* * * * *